(12) United States Patent
Feuerborn et al.

(10) Patent No.: US 11,015,694 B2
(45) Date of Patent: May 25, 2021

(54) BUSHING AND HUB TO PREVENT BACK-ROTATION

(71) Applicant: ContiTech USA, Inc., Fairlawn, OH (US)

(72) Inventors: Frank Feuerborn, Lincoln, NE (US); Mike Janne, Gretna, NE (US)

(73) Assignee: ContiTech Antriebssysteme GmbH, Hannover (DE)

( * ) Notice: Subject to any disclaimer, the term of this patent is extended or adjusted under 35 U.S.C. 154(b) by 103 days.

(21) Appl. No.: 16/662,752

(22) Filed: Oct. 24, 2019

(65) Prior Publication Data

US 2020/0056692 A1 Feb. 20, 2020

Related U.S. Application Data

(63) Continuation-in-part of application No. 16/426,256, filed on May 30, 2019, now Pat. No. 10,989,293, which is a continuation-in-part of application No. 15/995,937, filed on Jun. 1, 2018, now Pat. No. 10,865,868, which is a continuation-in-part of application No. 15/177,497, filed on Jun. 9, 2016, now abandoned.

(51) Int. Cl.
*F16H 55/18* (2006.01)

(52) U.S. Cl.
CPC .................... *F16H 55/18* (2013.01)

(58) Field of Classification Search
CPC .......... F16H 55/56; C08L 77/00; C08L 23/06; C08L 2207/068; C08F 110/02
USPC .................................................. 474/165, 199
See application file for complete search history.

(56) References Cited

U.S. PATENT DOCUMENTS

| | | | | |
|---|---|---|---|---|
| 22,154 | A * | 11/1858 | Barnard | F16C 33/3706 384/551 |
| 882,753 | A * | 3/1908 | Grant | 384/588 |
| 1,903,776 | A * | 4/1933 | Clark | F16C 35/077 29/892 |
| 1,953,362 | A * | 4/1934 | Murtaugh | B62D 55/135 474/164 |
| 2,269,821 | A * | 1/1942 | Kemphert | F16D 1/0864 474/170 |
| 2,691,541 | A | 10/1954 | Benedek | |
| 2,704,793 | A * | 3/1955 | Hanson | C25D 7/0657 191/1 A |
| 2,710,762 | A * | 6/1955 | Whitaker | F16D 1/096 403/16 |

(Continued)

FOREIGN PATENT DOCUMENTS

CN 101198809 A 6/2008
DE 202014100830 U1 4/2014
(Continued)

*Primary Examiner* — Henry Y Liu
(74) *Attorney, Agent, or Firm* — David L. Cate; Gregory Adams (57) ABSTRACT

An arrangement including a bushing having a bushing hub, a bushing flange, a housing containing a uni-directional bearing, an axle extending outward from the uni-directional bearing, and a stationary torque arm attached to the axle of the bushing. The bushing hub is inserted into a recessed hub section of a sprocket, and securely connected to the sprocket. The arrangement may also include a driven device attached to the bushing hub, and an endless drive belt and motor.

18 Claims, 3 Drawing Sheets

(56) References Cited

U.S. PATENT DOCUMENTS

| | | | | |
|---|---|---|---|---|
| 2,720,119 A | * | 10/1955 | Sherman | F16H 55/16 74/460 |
| 2,784,606 A | * | 3/1957 | Schilling | F16H 55/42 474/169 |
| 2,839,943 A | * | 6/1958 | Hausmann | F16H 55/06 74/445 |
| 2,890,071 A | | 6/1959 | Johnson | |
| 2,938,757 A | * | 5/1960 | Pieper | F16B 39/28 384/547 |
| 2,986,416 A | | 5/1961 | Firth | |
| 3,083,583 A | | 4/1963 | Reinhold | |
| 3,117,460 A | | 1/1964 | Traeger | |
| 3,180,171 A | * | 4/1965 | Arpin | F16H 55/06 74/460 |
| 3,226,995 A | * | 1/1966 | Getz | F16H 55/56 474/20 |
| 3,241,391 A | * | 3/1966 | Borro, Sr. | B29C 45/14 74/445 |
| 3,367,199 A | * | 2/1968 | Dankowski | F16H 55/42 474/199 |
| 3,596,943 A | * | 8/1971 | Krauss | F16D 1/09 403/370 |
| 3,638,974 A | * | 2/1972 | Stratienko | F16D 1/094 403/12 |
| 3,651,705 A | * | 3/1972 | Bertinetti | F16H 55/06 474/161 |
| 3,738,691 A | * | 6/1973 | Firth | F16D 1/096 403/370 |
| 3,744,330 A | | 7/1973 | Sugimoto | |
| 3,756,091 A | | 9/1973 | Miller | |
| 3,870,379 A | * | 3/1975 | Payne | B62D 55/24 305/181 |
| 3,924,481 A | | 12/1975 | Gregg | |
| 3,969,946 A | | 7/1976 | Gregg | |
| 3,975,965 A | * | 8/1976 | Speer | F16H 7/1281 474/135 |
| 4,002,081 A | * | 1/1977 | Schultz, Jr. | F16H 55/48 474/94 |
| 4,037,485 A | | 7/1977 | Hoback | |
| 4,041,789 A | | 8/1977 | Hoback | |
| 4,070,920 A | | 1/1978 | Leblanc | |
| 4,103,558 A | * | 8/1978 | Peabody | B60B 3/08 474/197 |
| 4,218,932 A | * | 8/1980 | McComber | F16H 7/023 180/9.62 |
| 4,233,852 A | | 11/1980 | Bruns | |
| 4,244,847 A | * | 1/1981 | Posiviata | C08L 9/06 524/14 |
| 4,304,502 A | * | 12/1981 | Stratienko | F16D 1/094 403/370 |
| 4,337,056 A | | 6/1982 | Bruns | |
| 4,365,964 A | * | 12/1982 | Krome, Jr. | F16H 55/56 474/28 |
| 4,366,609 A | * | 1/1983 | Speer | B29C 45/1418 264/266 |
| 4,403,979 A | | 9/1983 | Wujick | |
| 4,418,179 A | * | 11/1983 | DeWitt | C08G 61/08 525/249 |
| 4,427,403 A | | 1/1984 | Kanamori et al. | |
| 4,468,211 A | | 8/1984 | Hoshiro et al. | |
| 4,514,179 A | * | 4/1985 | Skura | F16G 1/28 474/204 |
| 4,515,577 A | | 5/1985 | Cathey et al. | |
| 4,570,786 A | * | 2/1986 | Morrison | B65G 39/02 198/842 |
| 4,586,915 A | | 5/1986 | Cathey et al. | |
| 4,604,080 A | | 8/1986 | Mizuno | |
| 4,605,389 A | | 8/1986 | Westhoff | |
| 4,614,509 A | | 9/1986 | Tangorra et al. | |
| 4,624,597 A | | 11/1986 | Johnson et al. | |
| 4,650,443 A | | 3/1987 | Wetzel | |
| 4,670,508 A | * | 6/1987 | Ohdaira | C08L 101/00 524/495 |
| 4,679,999 A | | 7/1987 | Wetzel | |
| 4,696,665 A | | 9/1987 | Macchiarulo et al. | |
| 4,717,370 A | * | 1/1988 | Rohrig | F16F 15/124 474/161 |
| 4,722,721 A | | 2/1988 | Wetzel | |
| 4,840,606 A | | 6/1989 | Wetzel | |
| 4,840,608 A | | 6/1989 | Araki et al. | |
| 4,878,886 A | | 11/1989 | Kitabayashi et al. | |
| 4,915,674 A | | 4/1990 | Tanaka et al. | |
| 4,929,221 A | | 5/1990 | Tanaka et al. | |
| 4,950,211 A | * | 8/1990 | James | F16H 55/30 180/9.1 |
| 4,988,231 A | * | 1/1991 | Pettit | F16B 3/04 403/370 |
| 4,991,993 A | * | 2/1991 | Watlington | F16D 1/0864 29/402.08 |
| 4,993,998 A | | 2/1991 | Tanaka et al. | |
| 5,015,218 A | | 5/1991 | Macchiarulo et al. | |
| 5,026,327 A | | 6/1991 | White, Jr. et al. | |
| 5,046,993 A | | 9/1991 | Macchiarulo et al. | |
| 5,059,464 A | * | 10/1991 | Mikuni | B29D 15/00 428/66.7 |
| 5,074,828 A | * | 12/1991 | Ellis | F16H 55/06 474/161 |
| 5,098,346 A | * | 3/1992 | Redmond | F16H 55/171 474/161 |
| 5,131,731 A | * | 7/1992 | Johnson | B62D 55/125 305/193 |
| 5,145,188 A | | 9/1992 | Bartelt et al. | |
| 5,201,635 A | * | 4/1993 | Steinmetz | B01F 7/00016 366/316 |
| RE34,485 E | | 12/1993 | Tanaka et al. | |
| 5,292,584 A | * | 3/1994 | Howard | A61L 27/44 428/327 |
| 5,304,101 A | * | 4/1994 | Baer | F16D 1/096 474/170 |
| 5,435,784 A | * | 7/1995 | Mark | F16D 1/096 464/182 |
| 5,441,458 A | * | 8/1995 | Rogus | F16H 7/1245 198/826 |
| 5,833,562 A | | 11/1998 | Walker, Sr. | |
| 5,852,951 A | * | 12/1998 | Santi | B29D 15/00 74/443 |
| 5,908,591 A | * | 6/1999 | Lewit | B29C 44/1261 264/46.4 |
| 5,931,755 A | * | 8/1999 | Mailey | B29C 45/27 474/161 |
| 5,934,447 A | * | 8/1999 | Kanaris | B65G 23/06 198/834 |
| 5,961,412 A | * | 10/1999 | Takahashi | F16G 5/20 428/222 |
| 6,176,797 B1 | * | 1/2001 | Vine | F16D 1/094 474/170 |
| 6,254,371 B1 | * | 7/2001 | McNally | B29C 33/22 425/214 |
| 6,485,384 B1 | | 11/2002 | Ochiai et al. | |
| 6,591,708 B2 | * | 7/2003 | Kobayashi | B29C 70/345 264/257 |
| 6,599,053 B1 | * | 7/2003 | Judson | F16D 1/096 403/368 |
| 6,767,491 B2 | * | 7/2004 | Kurokawa | B29C 43/027 264/138 |
| 6,976,921 B2 | * | 12/2005 | Mehlan | F16D 3/76 464/75 |
| 7,698,964 B2 | * | 4/2010 | Kashimura | F16H 55/16 74/461 |
| 7,814,809 B2 | * | 10/2010 | Shinohara | F16H 55/06 74/443 |
| 7,887,446 B2 | | 2/2011 | Hironaka | |
| 7,967,709 B2 | * | 6/2011 | Emura | B62M 9/105 474/161 |
| 8,070,634 B2 | | 12/2011 | Gaynor | |
| 8,312,959 B1 | | 11/2012 | Schneider et al. | |
| 8,822,753 B2 | | 9/2014 | Kawakami | |
| 9,360,099 B2 | * | 6/2016 | Wang | F16H 55/49 |
| 9,670,985 B2 | | 6/2017 | Sekiguchi et al. | |
| 9,950,768 B2 | | 4/2018 | Osaki et al. | |

(56) References Cited

U.S. PATENT DOCUMENTS

| | | | |
|---|---|---|---|
| 10,161,487 B2 | 12/2018 | Pease et al. | |
| 10,436,286 B2 | 10/2019 | Matsukawa | |
| 2002/0043124 A1* | 4/2002 | Shiga | B29D 15/00 74/434 |
| 2003/0195072 A1* | 10/2003 | Redmond | F16H 55/30 474/161 |
| 2005/0020392 A1 | 1/2005 | Redmond | |
| 2006/0254548 A1* | 11/2006 | Dec | F01L 1/02 123/90.31 |
| 2006/0264286 A1* | 11/2006 | Hodjat | F16H 55/171 474/152 |
| 2007/0021558 A1* | 1/2007 | Shinohara | C08L 77/06 525/66 |
| 2007/0202332 A1* | 8/2007 | Gunnewig | C08L 59/00 428/402 |
| 2008/0014602 A1* | 1/2008 | Nagano | C09B 11/08 435/18 |
| 2008/0146402 A1* | 6/2008 | Shinohara | F16H 55/06 475/331 |
| 2010/0081530 A1* | 4/2010 | Crump | B21K 1/30 474/152 |
| 2011/0250070 A1* | 10/2011 | Demtroder | B23P 11/025 416/170 R |
| 2013/0260624 A1* | 10/2013 | Rastogi | C08F 4/52 442/1 |
| 2014/0023817 A1* | 1/2014 | Kaushik | C08L 27/12 428/66.1 |
| 2014/0102387 A1* | 4/2014 | Taylor | F01L 1/3442 123/90.15 |
| 2014/0227548 A1* | 8/2014 | Myrick | C10L 1/28 428/570 |
| 2014/0243466 A1* | 8/2014 | Sinha | C08L 71/08 524/508 |
| 2015/0211623 A1* | 7/2015 | Inui | B23K 15/04 474/152 |
| 2015/0219203 A1* | 8/2015 | Pflug | F16H 7/023 474/91 |
| 2016/0016368 A1* | 1/2016 | Kunishima | F16H 55/06 74/434 |
| 2016/0090453 A1* | 3/2016 | Mathur | B32B 27/32 264/175 |
| 2016/0153541 A1* | 6/2016 | Fuchs | F16H 55/14 474/161 |
| 2016/0363206 A1* | 12/2016 | Modrzejewski | F16H 55/06 |
| 2017/0226242 A1* | 8/2017 | Smeets | C08F 4/6567 |
| 2017/0356540 A1 | 12/2017 | Feuerborn et al. | |
| 2018/0274648 A1 | 9/2018 | Feuerborn et al. | |
| 2019/0277384 A1 | 9/2019 | Feuerborn et al. | |
| 2020/0056692 A1 | 2/2020 | Feuerborn et al. | |

FOREIGN PATENT DOCUMENTS

| | | |
|---|---|---|
| DE | 112013003955 T5 | 4/2015 |
| EP | 0106694 A1 | 4/1984 |
| EP | 1176083 A1 | 1/2002 |
| EP | 1884540 A1 | 2/2008 |
| EP | 3015257 A1 | 5/2016 |
| JP | H07180747 A | 7/1995 |
| JP | 2000320626 A | 11/2000 |
| JP | 2001065648 A | 3/2001 |
| JP | 2002039329 A | 2/2002 |
| JP | 2006153249 A | 6/2006 |
| JP | 2014141048 A | 8/2014 |
| JP | 2015502285 A | 1/2015 |
| KR | 20060039006 A | 5/2006 |
| WO | 2013070404 A2 | 5/2013 |
| WO | 2014024377 A1 | 2/2014 |
| WO | 2015029840 A1 | 3/2015 |

* cited by examiner

BUSHING AND HUB TO PREVENT BACK-ROTATION

RELATED APPLICATION INFORMATION

This Patent Application is a continuation-in-part of, and claims priority to, U.S. Non-provisional patent application Ser. No. 16/307,950 filed Dec. 7, 2018, which was a national stage entry from PCT Patent Application No. PCT/EP2017/062294 filed May 22, 2017, both of which claimed priority to U.S. non-provisional patent application Ser. No. 15/177,497 filed Jun. 9, 2016 (now abandoned), the disclosures of which are incorporated herein in their entirety, by reference thereto. This Patent Application is also a continuation-in-part of U.S. Non-provisional patent application Ser. No. 15/995,937 filed Jun. 1, 2018 the disclosure of which is incorporated herein in its entirety, by reference thereto. This Patent Application is also a continuation-in-part of U.S. Non-provisional patent application Ser. No. 16/426,256 filed May 30, 2019 the disclosure of which is incorporated herein in its entirety, by reference thereto.

FIELD

The field to which the disclosure generally relates is mechanical arrangements with belt sprockets and bushings for driving devices when attached to a motor by an endless belt.

BACKGROUND

This section provides background information to facilitate a better understanding of the various aspects of the disclosure. It should be understood that the statements in this section of this document are to be read in this light, and not as admissions of prior art.

Sprockets typically include a plurality of teeth that are arranged in alternating fashion with groves. The teeth and grooves extend about an entire outer circumference of the sprocket. A toothed belt engages the toothed surface. Conventional sprockets for high torque applications are made of iron or steel. Often the sprocket is affixed onto a shaft with a bushing. The shaft is attached to a driven device, which is typically driven by a motor. The motor and sprocket are often connected by an endless belt.

Sprockets are typically used in an arrangement with a driven device, endless belt, and motor. Some driven devices, such as fan drives, especially air-cooled heat exchanger (ACHE) drives, can spin backwards when fans are switched off, in an undriven state, when subjected to air movement across the fan blades. This is known as back-drafting or wind-milling. Two problems may occur under such conditions. First, when the drive is restarted the entire system often experiences extreme shock load, leading to unnecessary wear of the motor components, endless belt breakage, and/or damage to the fan frame. Second, during maintenance the drive has to be forced to a stop and then has to be locked to prevent movement of the fan while technicians perform maintenance. Without safe measures for both processes the belt drive system may become further damaged, and in extreme cases bodily damage to the technician can occur. While various kits are available which may be adapted to a fan shaft or sprocket to prevent backward rotation, such kits are expensive and may be difficult to install.

Thus, there is an ongoing need for mechanical arrangements which are simple to install and prevent back rotation of a driven device, such need met, at least in part, with embodiments according to the following disclosure.

SUMMARY

This section provides a general summary of the disclosure, and is not a necessarily a comprehensive disclosure of its full scope or all of its features.

In a first aspect of the disclosure, a mechanical arrangement includes a bushing having a bushing hub, a bushing flange, a housing containing a uni-directional bearing, and an axle which extends outward from the uni-directional bearing. The bushing hub and the housing are disposed on opposing sides of the bushing flange, and the bushing hub has a smooth circular outer surface. The bushing hub may also be a tapered shape; for example, the taper may be formed at a rate of 0.0625 per unit length, or any suitable taper rate. The housing may serve as an anti-back rotation housing, and is a pocketed housing to attach the uni-directional bearing to the bushing while allowing clearance for a shaft of a driven device.

A torque arm is attached to the axle of the bushing. According to some aspects of the disclosure, the torque arm is securely connected to a stationary object. In such a configuration, while the hub is rotating, the torque arm remains stationary. Additionally, when the hub is not rotating, the torque arm remains stationary and prevents back rotation, or otherwise opposite direction rotation, of a driven device.

The arrangement also includes a sprocket having a body which defines an outer periphery, a recessed hub section defining an inner surface for engaging the bushing, and a continuous toothed structure disposed on the outer periphery of the body. The body may be formed of a castable polymer material. The recessed hub section of the sprocket may be shaped in such way to firmly receive and fit the bushing hub. Accordingly, the bushing hub is inserted into the recessed hub section with the smooth circular outer surface of the bushing engaged with the inner surface of the recessed hub, and the bushing hub is securely connected to the sprocket.

In some aspects, the bushing hub is securely connected to the sprocket by at least one connector which is passed through a bushing flange port and securely disposed in a threaded port of the sprocket. Alternatively, it is possible to have the connector passed through the sprocket and threaded into the bushing flange in a so called reverse mount.

The arrangement may include a driven device, where the bushing hub engages a shaft of the driven device. The arrangement may further include an endless drive belt and a motor, with the endless drive belt disposed on the continuous toothed structure of the sprocket, while also being disposed on a pulley of the motor. The driven device remains static when in an undriven state, and the torque arm remains static while the driven device is in a driven state. In some aspects, the endless drive belt, the pulley, the sprocket and the driven device are orientated in a substantially horizontal fashion, while in other aspects, they may be orientated substantially vertically. In some cases, the driven device is a cooling fan.

Referring again to the sprocket, a textile reinforcement may be embedded in the sprocket body adjacent the inner surface of the hub section of the sprocket. In some cases, the sprocket has a flange disposed on a side of the body immediately adjacent the continuous toothed structure. Also, in some cases, the sprocket has a textile reinforcement embedded in a surface of the flange immediately adjacent the continuous toothed structure. In some aspects, the sprocket further includes a textile reinforcement embedded in the continuous toothed structure outer surface. In some cases, the body of the sprocket is devoid of any metal structure, while in some other aspects, the body of the sprocket defines ports having threaded metal inserts disposed therein.

Also, the castable polymer used to form the body of the sprocket may further include ultra-high molecular weight powder in an amount of from 1% to 10% by weight, or even from 3% to 7% by weight, of the castable polymer material. The ultra-high molecular weight powder have an average particle size of from about 40 microns to about 80 microns. The castable polymer material may have a cured hardness of from 60 Shore D to 100 Shore D. In some cases, the castable polymer material is a polyurethane or an epoxy material.

In some other embodiments of the disclosure, an arrangement includes a bushing with a tapered bushing hub, a bushing flange, a housing containing a uni-directional bearing, and an axle extending outward from the uni-directional bearing. The tapered bushing hub and the housing are disposed on opposing sides of the bushing flange, and the tapered bushing hub comprises a smooth circular outer surface. A torque arm is attached to the axle of the bushing, and the torque arm is securely connected to a stationary object. The arrangement further includes a sprocket having a body defining an outer periphery, a recessed hub section defining an inner surface for engaging the tapered bushing hub, and a continuous toothed structure disposed on the outer periphery of the body. The body is formed of a castable polymer material. The tapered bushing hub is inserted into the recessed hub section with the smooth circular outer surface of the tapered bushing hub engaged with the inner surface of the recessed hub, and the bushing is securely connected to the sprocket.

The arrangement may further include a cooling fan assembly attached to the tapered bushing hub through a shaft of the cooling fan assembly, and an endless drive belt and a motor. The endless drive belt is disposed on the continuous toothed structure while also being disposed on a pulley of the motor. In some cases the endless drive belt, the pulley, the sprocket and the driven device are horizontally orientated. The fan of the cooling fan assembly may remain static when in an undriven state, and the torque arm may remain static while the fan is in a driven state.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a range or dimension listed or described as being useful, suitable, or the like, is intended that any and every concentration or amount or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some embodiments according to the disclosure are mechanical arrangements including a bushing having a bushing hub, a bushing flange, a housing containing a uni-directional bearing, an axle extending outward from the uni-directional bearing, and a stationary torque arm attached to the axle of the bushing. The bushing hub is inserted into a recessed hub section of a sprocket, and securely connected to the sprocket. The arrangement may also include a driven device attached to the bushing hub, and an endless drive belt and motor. The driven device, in some aspects, is a cooling fan assembly.

Figure 1:
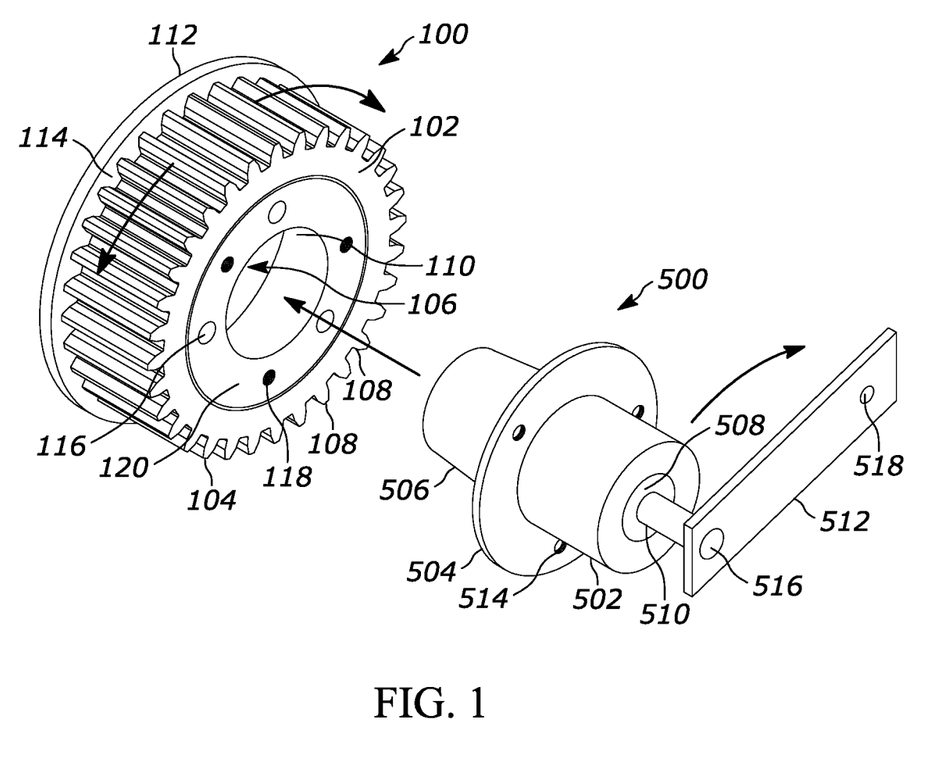
FIG. 1 illustrates a sprocket and hub in a perspective view, according to an embodiment of the disclosure.

Now referencing FIG. 1, which depicts one arrangement, or a portion thereof, according to the disclosure. The mechanical arrangement includes a sprocket 100, which may be similar to, or like, those sprockets described in U.S. Non-provisional patent application Ser. No. 16/307,950, U.S. non-provisional patent application Ser. No. 15/177,497, U.S. Non-provisional patent application Ser. No. 15/995, 937, and U.S. Non-provisional patent application Ser. No.

16/426,256, the disclosures of which are incorporated herein in their entirety, by reference thereto. Sprocket 100, as depicted in the perspective view presented in FIG. 1, includes a body 102 defining an outer periphery 104, and a hub section 106 for engaging a bushing. A continuous toothed structure 108 is disposed completely around the outer periphery of the body 102. In some embodiments, a textile reinforcement is embedded in the hub section adjacent inner surface 110. The textile reinforcement may embedded adjacent inner surface 110 at any suitable distance from inner surface 110, so that it may provide effective shape maintaining strength to the overall body 102 from hoop stresses imparted onto body 102 when a bushing is installed into hub section 106.

The body 102 may be formed of a castable polymer material, and in some aspects, may be essentially free or devoid of any metal structure, or structures. In some other aspects, the body 102 is formed of a castable polymer material, and includes a metal hub upon which the castable polymer body 102 is adhered to, cast upon, or otherwise installed upon. In some other embodiments, the body 102 is formed of a castable polymer material essentially free or devoid of any metal structure(s) other than metallic threaded inserts and/or metallic collars installed within ports of the body 102 for retaining an installed bushing; and in such cases, it is within the definition of "essentially free or devoid of any metal structure(s)" when such separate metallic parts are installed into one or more ports, or even partial ports, as described in further detail below.

In some embodiments, the continuous toothed structure 108 disposed around the outer periphery of body 102 is an extension of, or otherwise formed from, the castable material forming body 102. In such cases, the matrix of material forming body 102 and toothed structure 108 is essentially a continuous matrix, and even so in cases where suitable textile reinforcement material(s) are embedded therein. In some alternative embodiments, the continuous toothed structure 108 disposed around the outer periphery of body 102 is formed a different material from the castable material forming body 102, such as a different polymeric material or composite, or even metal, such as steel, aluminum, and the like. Also, optionally, in some embodiments, an outer portion of the body 102 is formed of the castable polymer material and an inner portion of the body is formed of steel, 120, as alternatively illustrated in FIG. 1.

In some aspects, an optional flange 112 is disposed on a side of the body 102 immediately adjacent the continuous toothed structure 108. Although one flange is shown in the embodiment illustrated in FIG. 1, it is within the scope of the disclosure that sprocket embodiments have zero, one or two flanges. In some embodiments, a textile reinforcement is embedded in the side surface 114 of the flange 112 (or flanges when two are used) immediately adjacent the continuous toothed structure 108. Also, in some embodiments, a textile reinforcement is embedded in the continuous toothed structure 108 outer surface. As further shown in FIG. 1, body 102 may include ports 116, 118 formed therein for such purposes as attachment to other components with suitable fasteners for retaining a bushing, balance, weight optimization, temperature conductivity, and the like.

The mechanical arrangement depicted in FIG. 1 further includes a bushing 500 having a bushing hub 506, a bushing flange 504, a housing 502 containing a uni-directional bearing 508, and an axle 510 extending outward from the uni-directional bearing 508. The bushing hub 506 and the housing 502 are disposed on opposing sides of the bushing flange 504. The bushing hub 506 has a smooth circular outer surface, and may be tapered as shown. A torque arm 512 is securely attached to the axle 510 of the bushing 500.

Figure 2:
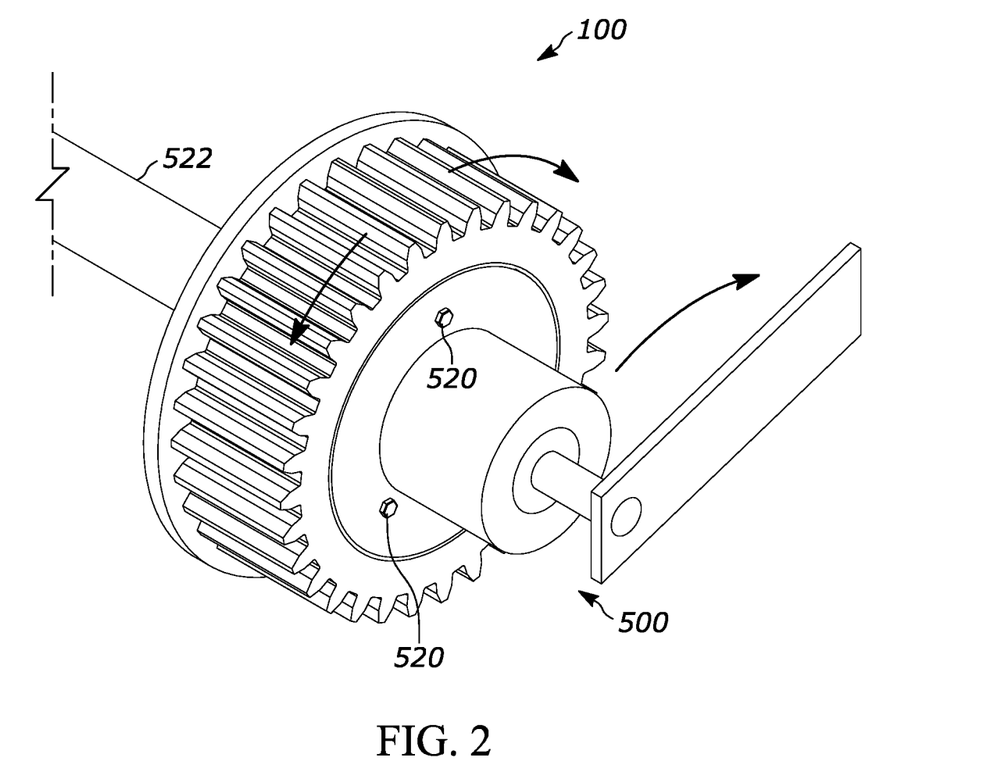
FIG. 2 depicts the sprocket and hub securely connected, in a perspective view, according to an embodiment of the disclosure; and, FIG. 3 shows in a side view, another embodiment according to the disclosure.

The bushing hub 506 is inserted into the recessed hub section 106 of sprocket 100, with the smooth circular outer surface of the bushing hub 506 engaged with the inner surface of the recessed hub section 106. The bushing 500 may then be securely connected to the sprocket 100. With reference to FIG. 2, which shows bushing 500 securely connected to sprocket 100, fasteners 520 may be used for providing the secure connection. In an alternative embodiment, the fasteners are passed through the sprocket 100 and threaded into the bushing flange 504 in a so called reverse mount.

Figure 3:
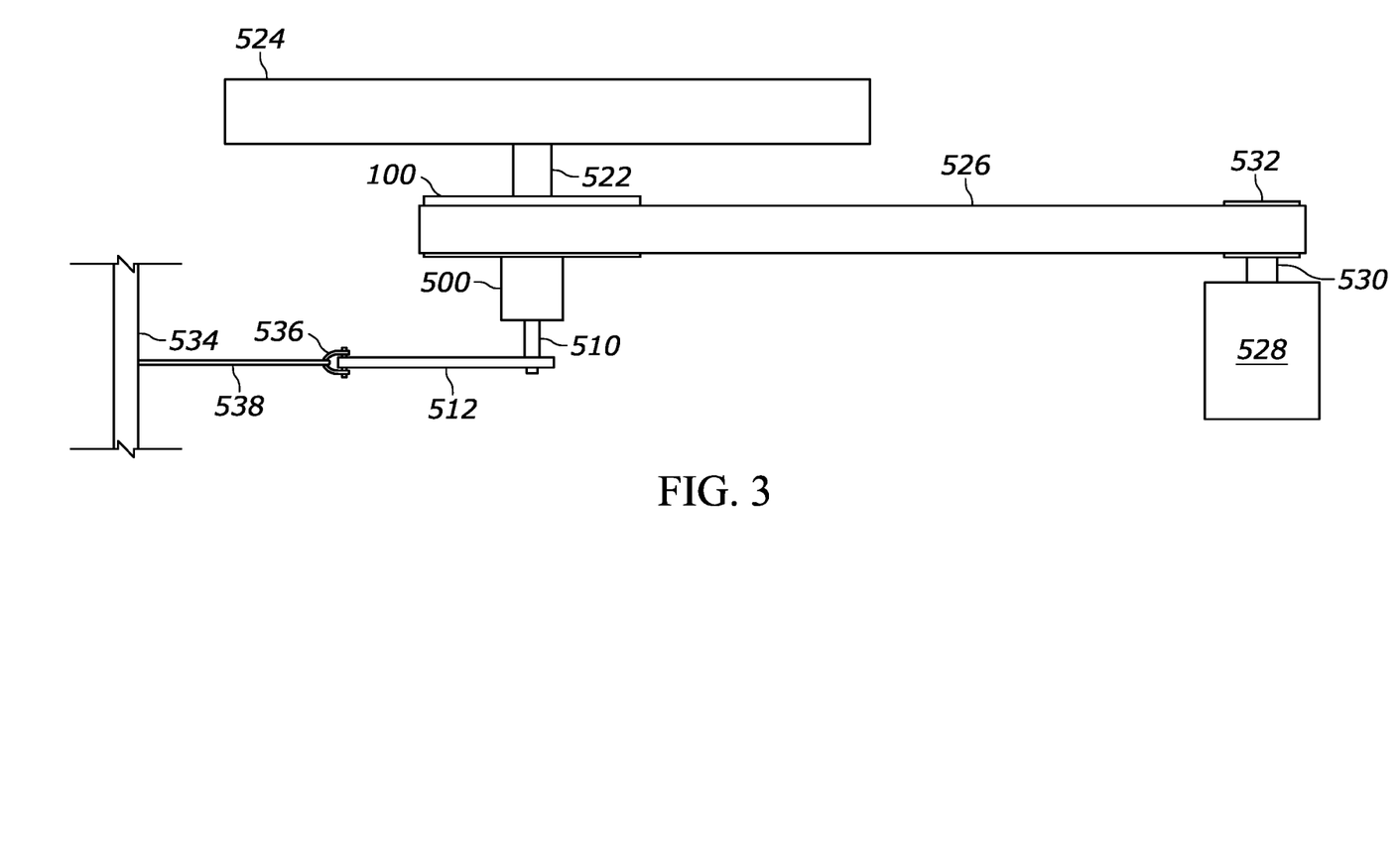

Now referencing FIG. 3, which depicts another embodiment according to the disclosure. The mechanical arrangement shown in FIG. 3 includes a bushing 500, such as those described above, securely connected with a sprocket 100, such as those described above. Bushing 500 includes torque arm 512 attached to the axle 510 of bushing 500, and torque arm 512 is securely connected to a stationary object 534. The arrangement further includes a driven device 522, such as a cooling fan assembly, which is attached to the hub of bushing 500 through a shaft 522 of the driven device 524. An endless 526 drive belt is disposed on the continuous toothed structure of sprocket 100, while also being disposed on pulley 532 attached to the motor 528 via motor shaft 530. As shown, endless drive belt 526, pulley 532, sprocket 100, and the driven device 524 are horizontally orientated.

Torque arm 512 is shown as securely connected to a stationary object 534 using connector 536 and securing line 538. The connector 536 and securing line 538 may be any suitable device, or combination of devices, for securing torque arm 512. Secured torque arm 512 maintains device 524 in a static state when undriven, and torque arm 512 remains in a static state while driven device 524 is in a driven state. In such way, the mechanical arrangement shown is simple to install, and prevent back rotation of the driven device 524.

Embodiments of the disclosure are useful anti-rotation devices providing a safe solution for ACHE belt drive systems, and the arrangements may prevent back-drafting of fans, eliminates hard starts during wind-milling conditions, avoids damage to belt drive systems and structures during start up, protects maintenance personnel from serious injury during maintenance operations, may be adapted to clockwise or counter-clockwise rotation, and may fit within most fan cages or guards without modification.

Now referencing the construction and materials used in forming sprocket 100 of embodiments of the disclosure. Any suitable textile reinforcement materials may be used in embodiments according to the disclosure, including, but not limited to, woven or non-woven materials, in any desirable weight and orientation, and in some cases is comprised of multiple individual plies separated by appropriate elastomeric or adhesive layers. In some other aspects, the textile reinforcement are single plies. The textile reinforcement materials may be based upon a wide variety of synthetic and natural fibers, including polyester, nylon, aramid (e.g., Kevlar), glass, polypropylene, carbon cordage, cellulose, wool, or others. The fibers may be multi-filament, monofilament, or staple fibers. In some embodiments, the textile reinforcement materials are single plies of polyester and/or nylon. The polyester can be polyethylene terephthalate or polyethylene naphthalate. In some cases the polyester can be a copolyester that contains repeat units, which are derived from both terephthalic acid and isophthalic acid or dimethyl esters thereof. In such cases, the copolyester will typically contain at least about 95 weight percent terephthalic acid and up to about 5 weight percent isophthalic acid. More typically, the copolyester will contain at least about 97 weight percent terephthalic acid and up to about 3 weight percent isophthalic acid. The polyester fabric can optionally be made from polyester staple yarn to improve adhesion characteristics. The nylon fabrics that can be used in conjunction with this disclosure may be comprised of virtually any type of nylon, such as nylon-6,6, nylon-6,12, nylon-6,10, nylon-6,9, nylon-6, nylon-11, or nylon-12. For commercial reasons, the nylon will typically be nylon-6,6 or nylon-6.

Castable materials forming the sprocket bodies according to the disclosure include castable polymer materials, such as polyurethane polymers, polyester polymers, epoxy polymers, and the like. Polymer casting is a method of casting where a mold is filled with a liquid synthetic polymer, which then hardens. In embodiments according to the disclosure, casting may be accomplished with the liquid polymer plus an effective amount of a "hardener" liquid, which functionally contains a second polymer or reactant, for use in forming a final product which is a copolymer. Copolymers contain two different alternating chemical entities in the final polymer molecule. For example, in a polyurethane casting process, the polyurethane polymer structure may be formed by reacting a di- or polyisocyanate with a polyol. Both the isocyanates and polyols used to make polyurethanes contain on average two or more functional groups per molecule. The materials are mixed, introduced into the mold, and exposed to certain conditions (i.e. temperature, time, pressure, etc.) to form the polyurethane polymer structure or body. In some aspects, the sprocket bodies, or portions thereof, are prepared by a low pressure casting process where pressure within an empty mold is sufficiently reduced, and low pressure is used to transfer the reaction components into the empty mold, which then react and cast the sprocket body within the mold. In some other aspects, the sprockets are formed using a compression mold process which does not involve lowering pressure in the mold, but rather, high pressure is used to transfer the reaction components into the empty mold, and sufficient forces are placed on the components in the formation of the sprocket in the mold.

The polymeric materials used forming the sprocket bodies may also be mixed with various additives in conventional or suitable amounts known to persons having ordinary skill in the art. Such additives may include, and are not limited to, cross-linking agents, accelerators, retardants to prevent an unduly quick cure, antioxidants, aging resistance aids (e.g., ozone and UV resistance), adhesion promoters, processing aids, flame retardancy additives, reinforcing agents and fillers, such as carbon black, silica, other mineral fillers, lignin, fibers, friction modifiers such as UHMWPE and PTFE, and the like. In some cases, carbon black, silver salts, or any other suitable electrically conductive materials may also be added to control and/or reduce static electricity buildup. Reinforcing fillers are typically utilized at a level which is within the range of about 1 parts per hundred parts of resin (phr) to about 50 phr.

In some embodiments ultra-high molecular weight polyethylene (UHMWPE) is incorporated into the castable polymer material mixture in a suitable amount to provide increased durability to the sprocket. Any suitable shape of UHMWPE particles may be used, for example, powder, fibers, and the like. In cases where UHMWPE powder is used, the average size of the particles in the powder may be from about 20 microns to about 100 microns, from about 40 microns to about 80 microns, or even from about 50 microns to about 70 microns. The UHMWPE powder may be incorporated in suitable amounts, such as from about 1% to about 10% by weight of the castable polymer material, from about 2% to about 8% by weight of the castable polymer material, or even from about 3% to about 7% by weight of the castable polymer material. In any case, when the UHMWPE powder is incorporated into the castable polymer material mixture, the mixture needs to have a low enough viscosity to be processed through gear pumps on automated mixing equipment, which is typically used in the art for processing such products.

In some cases, the hardness of the final cured castable polymer material mixture including UHMWPE powder, or otherwise the produced sprocket, is from about 60 Shore D to about 100 Shore D hardness value, or even from about 75 Shore D to about 85 Shore D hardness value.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE NUMERALS (PART OF THE SPECIFICATION)

100 Sprocket
102 Body
104 Outer periphery
106 Recessed hub section
108 Continuous toothed structure
110 Inner surface
112 Sprocket flange
114 Side surface
116 Port
118 Threaded port
120 Inner portion of the body formed of steel
500 Bushing
502 Housing
504 Bushing flange
506 Bushing hub
508 Uni-directional bearing
510 Axle
512 Torque arm
514 Bushing flange ports
516 Torque arm/axle connector
518 Torque arm port
520 Fasteners
522 Driven shaft
524 Driven device
526 Endless drive belt
528 Motor
530 Motor shaft
532 Motor pulley
534 Stationary object
536 Connector
538 Securing line

What is claimed is:

1. An arrangement comprising:
a bushing comprising a bushing hub, a bushing flange, a housing containing a uni-directional bearing, and an axle extending outward from the uni-directional bearing, wherein the bushing hub and the housing are disposed on opposing sides of the bushing flange, and wherein the bushing hub comprises a smooth circular outer surface;
a torque arm attached to the axle of the bushing;
a sprocket comprising a body defining an outer periphery, a recessed hub section defining an inner surface for engaging the bushing, and a continuous toothed structure disposed on the outer periphery of the body, wherein the body is formed of a castable polyurethane material which comprises ultra-high molecular weight powder in an amount of from 1% to 10% by weight of the castable polyurethane material, and provided the castable polyurethane material is devoid of fibers;
wherein the castable polyurethane material consists of a liquid which fills a mold and hardens to form the body; and,
wherein the bushing hub is inserted into the recessed hub section with the smooth circular outer surface of the bushing engaged with the inner surface of the recessed hub, and wherein the bushing hub is securely connected to the sprocket.

2. The arrangement according to claim 1, wherein the bushing hub is securely connected to the sprocket by at least one connector which is passed through a bushing flange port and securely disposed in a threaded port of the sprocket.

3. The arrangement according to claim 1, wherein the torque arm is securely connected to a stationary object.

4. The arrangement according to claim 1, further comprising a driven device, wherein the bushing hub engages a shaft of the driven device.

5. The arrangement according to claim 4, further comprising an endless drive belt and a motor, wherein the endless drive belt is disposed on the continuous toothed structure while also being disposed on a pulley of the motor.

6. The arrangement according to claim 5, wherein the endless drive belt, the pulley, the sprocket and the driven device are horizontally orientated.

7. The arrangement according to claim 6, wherein the driven device is a cooling fan.

8. The arrangement according to claim 1, wherein a textile reinforcement is embedded in the body adjacent the inner surface of the hub section of the sprocket.

9. The arrangement according to claim 1, wherein the sprocket further comprises a flange disposed on a side of the body immediately adjacent the continuous toothed structure.

10. The arrangement according to claim 9, wherein the sprocket further comprises a textile reinforcement embedded in a surface of the flange immediately adjacent the continuous toothed structure.

11. The arrangement according to claim 1, wherein the sprocket further comprises a textile reinforcement embedded in the continuous toothed structure outer surface.

12. The arrangement according to claim 1, wherein the castable polyurethane material comprises the ultra-high molecular weight powder in an amount of from 3% to 7% by weight of the castable polyurethane material.

13. The arrangement according to claim 12, wherein the ultra-high molecular weight powder has an average particle size of from 40 microns to 80 microns.

14. The arrangement according to claim 1, wherein the castable polyurethane material has a cured hardness of from 60 Shore D to 100 Shore D.

15. The arrangement according to claim 1, wherein the body of the sprocket is devoid of any metal structure.

16. The arrangement according to claim 1, wherein the body of the sprocket defines ports comprising threaded metal inserts disposed therein.

17. The arrangement according to claim 1, further comprising a driven device, wherein the bushing hub engages a shaft of the driven device, and wherein the driven device remains static when in an undriven state.

18. The arrangement according to claim 1, further comprising a driven device, wherein the bushing hub engages a shaft of the driven device, and wherein the torque arm remains static while the driven device is in a driven state.

* * * * *